(12) United States Patent
Mukhopadhyay et al.

(10) Patent No.: US 11,960,730 B2
(45) Date of Patent: Apr. 16, 2024

(54) DISTRIBUTED EXCEPTION HANDLING IN SOLID STATE DRIVES

(71) Applicant: Western Digital Technologies, Inc., San Jose, CA (US)

(72) Inventors: Rishi Mukhopadhyay, Bangalore (IN); Shiva K, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/360,671

(22) Filed: Jun. 28, 2021

(65) Prior Publication Data
US 2022/0413712 A1    Dec. 29, 2022

(51) Int. Cl.
*G06F 3/06*    (2006.01)

(52) U.S. Cl.
CPC .......... *G06F 3/0619* (2013.01); *G06F 3/0626* (2013.01); *G06F 3/0659* (2013.01); *G06F 3/0679* (2013.01)

(58) Field of Classification Search
CPC .......................................... G06F 9/3861–3865
See application file for complete search history.

(56) References Cited

U.S. PATENT DOCUMENTS

| | | | |
|---|---|---|---|
| 7,222,200 B2 | 5/2007 | Gupta et al. | |
| 9,430,419 B2 | 8/2016 | Jones et al. | |
| 10,860,511 B1 | 12/2020 | Thompson et al. | |
| 2006/0149952 A1* | 7/2006 | Blinick | G06F 9/3861 |
| | | | 712/E9.06 |
| 2007/0043347 A1* | 2/2007 | Solomita | G06F 9/5083 |
| | | | 606/33 |
| 2009/0217011 A1* | 8/2009 | Circello | G06F 9/3861 |
| | | | 712/E9.016 |
| 2011/0231616 A1 | 9/2011 | Lin | |

(Continued)

FOREIGN PATENT DOCUMENTS

KR    10-2014-0091747 A    7/2014

OTHER PUBLICATIONS

International Search Report and Written Opinion, PCT Application No. PCT/US2022/017875, dated Jun. 30, 2022.

*Primary Examiner* — Stephanie Wu
(74) *Attorney, Agent, or Firm* — Rutan & Tucker LLP; Hani Z. Sayed; Ravi Mohan

(57) ABSTRACT

Systems and methods described herein synchronize events between various components of storage device during the processing of an exception (i.e., an internal error). The storage device can have a plurality of processors which may each coordinate operations on various domains of storage device processing tasks. An exception occurring in one domain may require input and coordination from other domains within the storage device. Each exception may have a list of predetermined steps needed for completion which are coordinated via a series of sync points placed between exception action clusters which perform a series of specific operations until data or processing from another domain is needed to continue processing. The sync points can be utilized to halt processing in one domain until the other domains are in sync and complete one or more exception action operations. In this way, a streamlined and predictable synchronization between domains may occur during an exception.

9 Claims, 10 Drawing Sheets

(56) References Cited

U.S. PATENT DOCUMENTS

| | | | |
|---|---|---|---|
| 2015/0026238 A1* | 1/2015 | Natarajan | H04L 67/10 |
| | | | 709/203 |
| 2015/0317474 A1 | 11/2015 | Grocutt | |
| 2017/0004005 A1* | 1/2017 | Elliott | G06F 9/542 |
| 2017/0277448 A1 | 9/2017 | Khoueir et al. | |
| 2019/0310905 A1* | 10/2019 | Shin | G06F 11/0793 |
| 2020/0201568 A1 | 6/2020 | Park et al. | |
| 2021/0081238 A1 | 3/2021 | Lamberts et al. | |

* cited by examiner

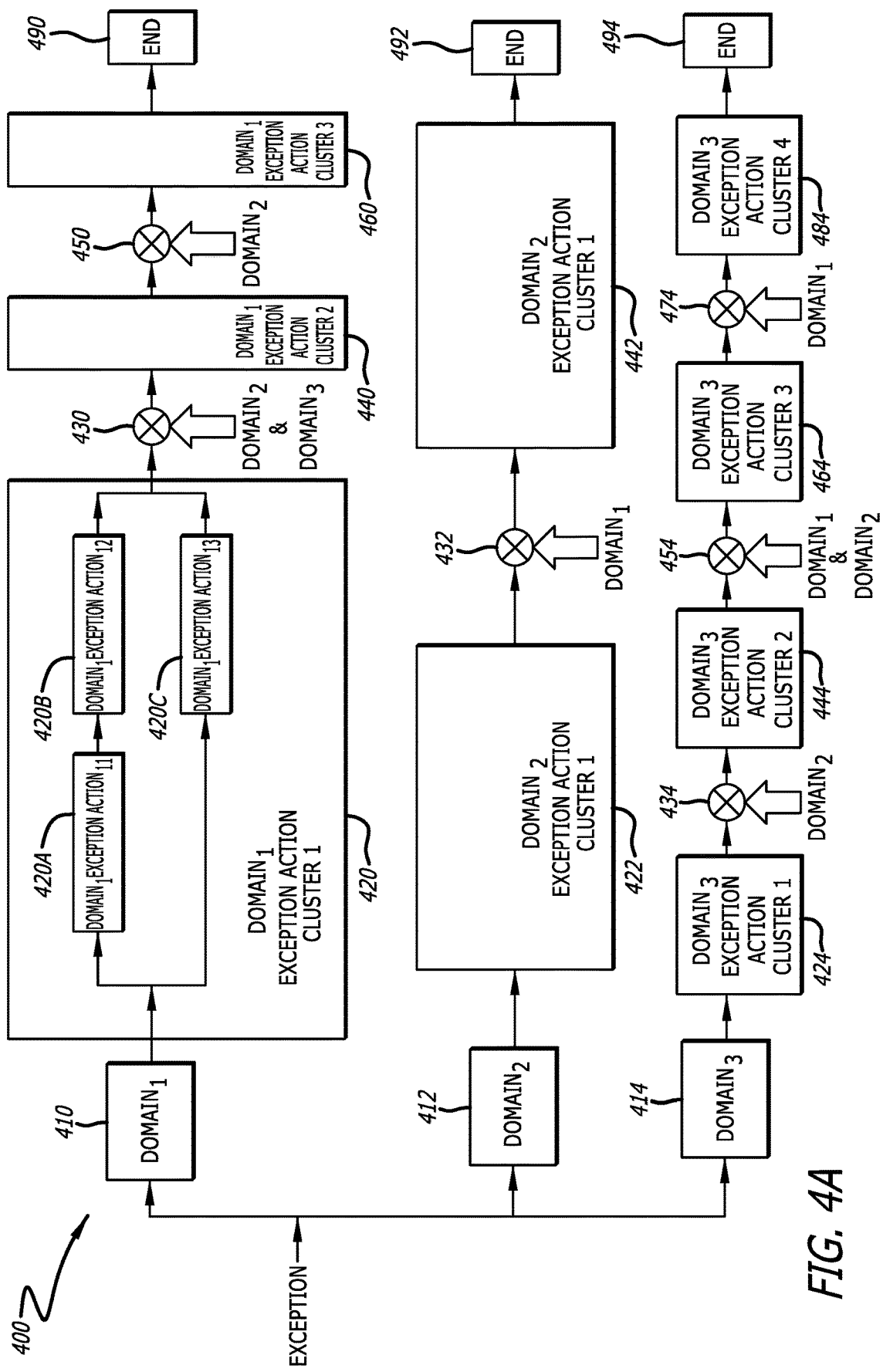

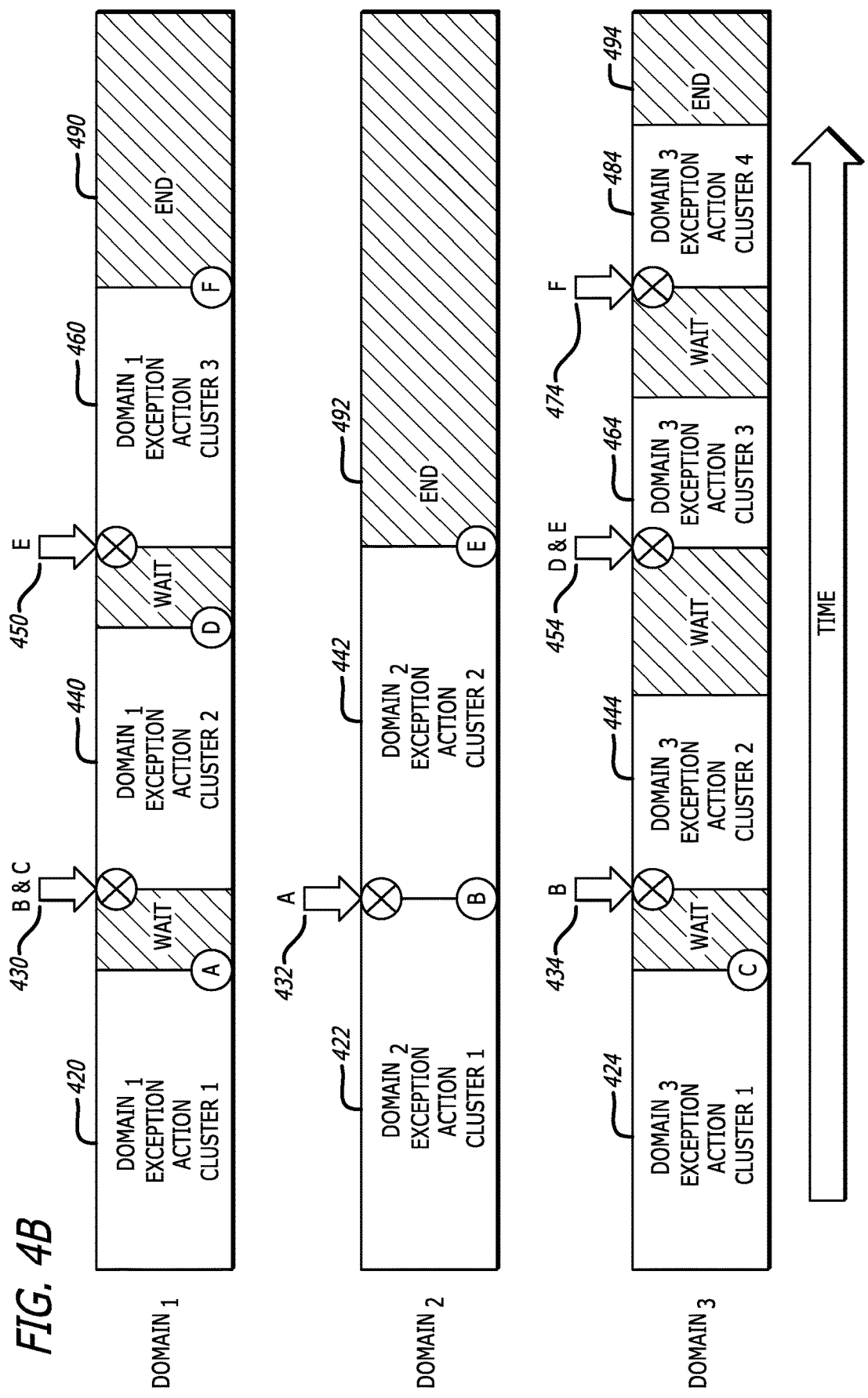

DISTRIBUTED EXCEPTION HANDLING IN SOLID STATE DRIVES

FIELD

The present disclosure relates to Solid State Drive (SSD) controllers. More particularly, the present disclosure relates to exception handling in SSD controllers.

BACKGROUND

In recent years, the trend in technology development towards faster, lower power, higher capacity, and less expensive computational equipment has continued apace. Processor Integrated Circuits (ICs) continue to comprise more computational cores and other specialized processors, main computer memories comprise more bits of higher performance Dynamic Random Access Memory (DRAM) chips, and mass storage (e.g., SSD, Hard Disk Drive (HDD), etc.) devices capable of higher bit densities at lower costs.

SSDs have become an increasingly attractive technology given the decreasing costs and rapid increases in capacity provided by Three-Dimensional (3D) NAND flash structures storing multiple bits per memory cell. The increasing complexity of the underlying NAND flash technology has led to an increase in the complexity of SSD controllers. The number of tasks required of these controllers has resulted in a proliferation of processor cores, each operating in its own domain. These domains may be operating independently, asynchronously, at different clock frequencies, different operating voltages, etc.

Different tasks in the SSD controller may require action by one or more of these domains. Synchronizing multiple compute domains can be complex. This can be particularly true for exception handling, which may require a rapid response in real-time by the SSD controller. Exceptions, sometimes called errors, are events that may occur outside of what is considered the usual reading and/or writing operations of the SSD. Examples would be occurrences like a hardware or software interrupt to one or more processors, a bad block or write error in one of the NAND flash chips or other hardware failure, recovery from a power outage, receipt of erroneous or illegal commands from the host computing device to the SSD, etc. Provision may be made in the hardware and/or software to correctly handle each of these exceptional occurrences to avoid unnecessary disruption of the SSD operation.

BRIEF DESCRIPTION OF DRAWINGS

The above and other aspects, features, and advantages of several embodiments of the present disclosure will be more apparent from the following description is presented in conjunction with the following several figures of the drawings.

FIG. 4A is a conceptual diagram of exception handling across multiple domains in accordance with an embodiment of the disclosure;

FIG. 4B is a timing diagram of exception handling across multiple domains in accordance with an embodiment of the disclosure;

Figure 1:
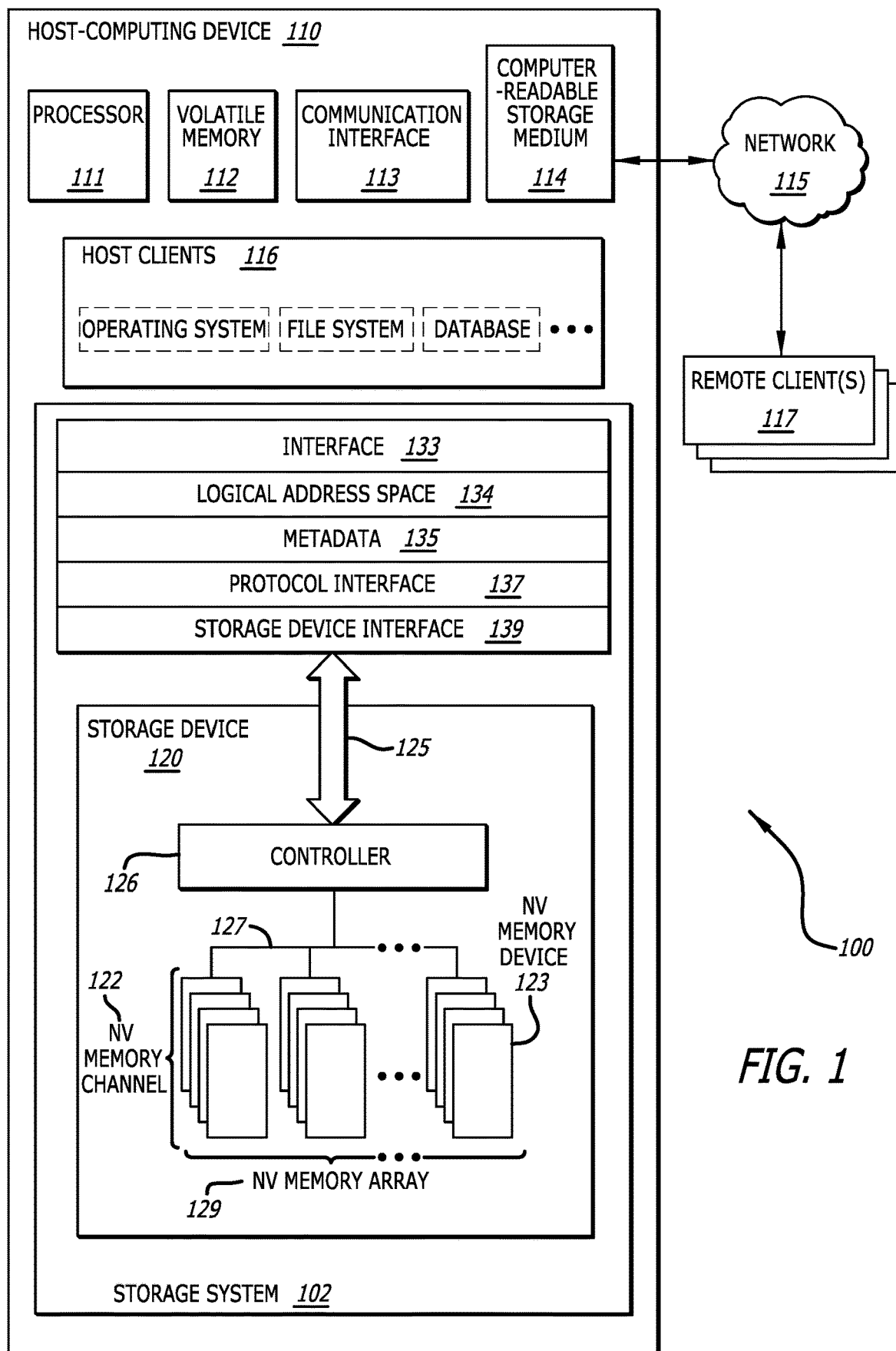
FIG. 1 is a schematic block diagram of a host-computing device with a storage device suitable for handling exceptions in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the problems and scenarios described above, embodiments are disclosed to efficiently handle exceptions within SSDs. SSDs often include one or more controllers which may comprise multiple processors operating in different domains which may be configured to control the operation of various aspects of the SSD operation. These domains may be asynchronous to each other, may operate independently, process data at different clock frequencies, and even operate with different power supplies and voltage levels. Each domain may have its own processor and process its own firmware code. At times domains may need to communicate and synchronize with other domains to perform a series of actions when these actions have dependencies that involve multiple domains. These actions may be those needed for the routine operation of the SSD, but they may also be in response to errors and other unusual events that may occur from time to time. These events are referred to as exceptions.

When exceptions occur, they are classified and/or identified, and different actions may be taken in response. These actions may be taken by a single domain or may be distributed across multiple domains. For each domain, exception handling logic may identify the pre-determined exception actions that may be needed by that domain based on the specific classification or identification of the occurring exception. These exception actions may be grouped into exception action clusters. Exception action clusters may process their exception actions in series and/or in parallel in their own domain without regard to what may be occurring in other domains. When an exception action cluster completes execution, the domain may pause at a sync point pending the arrival of a sync point requirement. The sync point requirement may be based on the completion of particular exception action clusters or on individual exception actions in other domains. When the sync point requirement is met, the domain may proceed to the next exception action cluster, which may operate without regard to the other domains until it finishes execution at the next sync point. A domain may process as many exception action clusters sync points as necessary to complete its portion of handling an exception.

An exception scheduler may monitor the processing of exception action clusters and may note and/or log the completion of individual exception actions and/or the arrival of each exception action cluster at its associated sync points. In some embodiments, the exception scheduler may generate the sync point requirement for a domain when the necessary exception action clusters in other domains have completed processing. In other embodiments, the domains may monitor the progress of the other domains and make their own determination of the fulfillment of the sync point requirements. Once the sync point requirement has been met for an event action cluster in a domain, the next exception action cluster may proceed now that certain prerequisite actions have occurred and/or certain data is available. This process may proceed until all of the relevant domains have completed all of their individual exception action clusters and the exception has been completely handled.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device with a storage device suitable for handling exceptions in accordance with an embodiment of the disclosure is shown. The exception handling system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more dual inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in some embodiments, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a Serial Advanced Technology Attachment (SATA) bus, a Parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an InfiniBand network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. The device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. If storage device 120 is a multi-protocol device, a protocol interface 137 may be used to select the correct or desired protocol. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a Serial Advanced Technology Attachment (SATA) bus, a parallel ATA bus, a small computer system interface (SCSI), FireWire, Fibre Channel, a Universal Serial Bus (USB), a PCIe Advanced Switching (PCIe-AS) bus, a network 115, InfiniBand, SCSI RDMA, Non-Volatile Memory Express (NVMe), or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, may comprise storage class memory (SCM) (e.g., write in place memory, or the like).

The non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, microcontrollers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
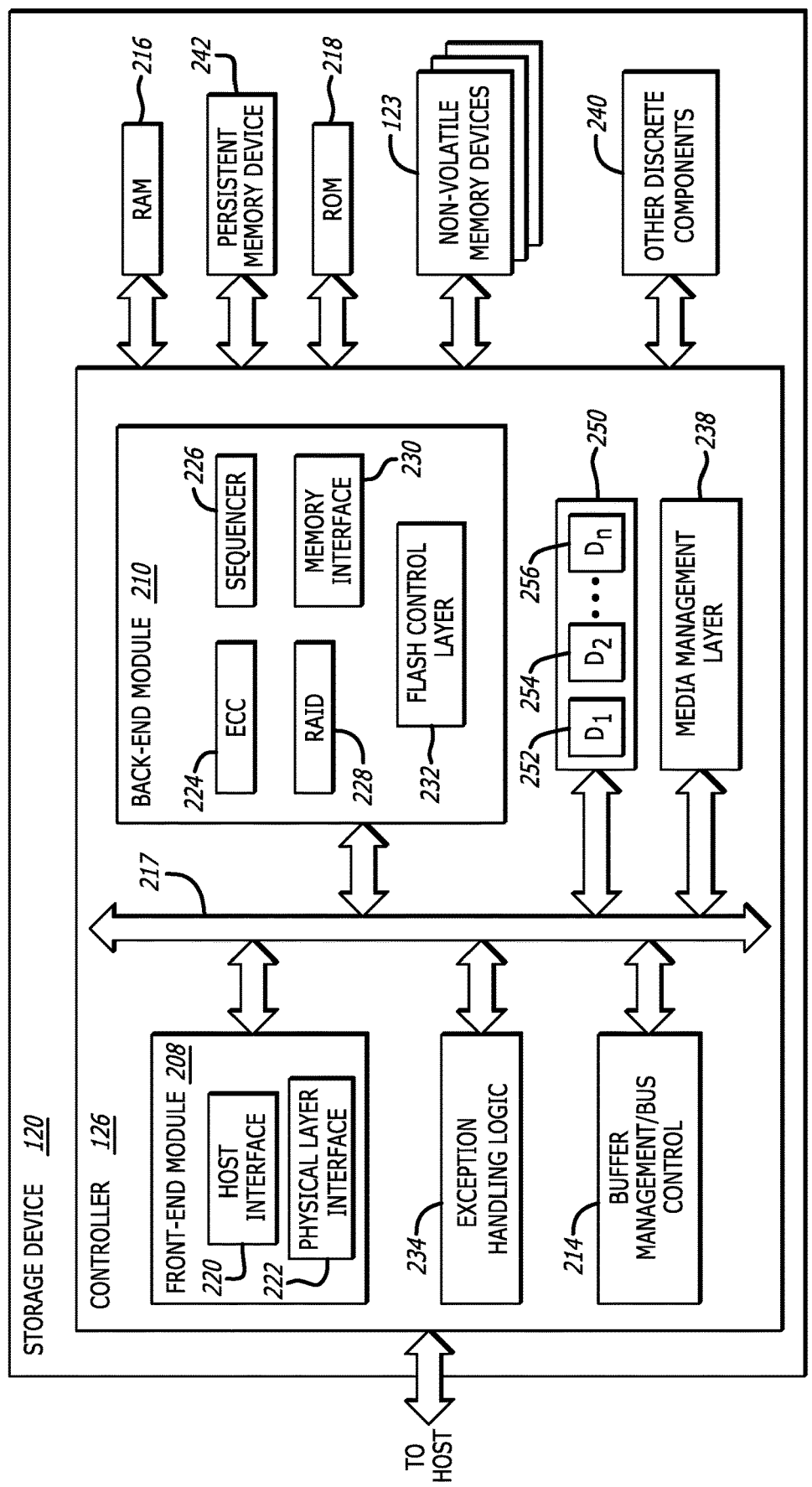
FIG. 2 is a schematic block diagram of a storage device suitable for handling exceptions in accordance with an embodiment of the disclosure.

Referring to FIG. 2, a schematic block diagram of a storage device suitable for handling exceptions in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some embodiments, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies.

Additionally, the front-end module 208 may include a host interface 220 and a physical layer interface 222 that provides the electrical interface with the host or next-level storage controller. The choice of the type of the host interface 220 can depend on the type of memory being used. Embodiment types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction code (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages the generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238, and buffer management/bus control module 214 are optional components that may not be necessary in the controller 126.

Controller 126 further comprises a plurality of domains 250 including Domain$_1$ (D$_1$ in the FIG. 252, Domaine (D$_2$ in the FIG. 254, and Domain$_n$, (D$_n$, in the FIG. 256, where N is an integer representing the total number of domains 250. The exact number of domains 250 may be a matter of design choice. In some embodiments, a domain may comprise one or more processors, a random access memory (RAM), an interrupt controller, an event dispatcher, and circuitry to interface with the other domains as well as other modules like, for example, an exception scheduler, in controller 126. These domains 250 may each have its own area of responsibility, but one, some, or all of them may be used to process exceptions when they occur.

Exception handling logic 234 is a module that may detect, classify, dispatch, and synchronize responses to one or more of the domains 250 for any exceptions that may occur, and may resolve conflicts between exceptions of differing criticality. It is understood that exception handling logic 234 may be implemented in hardware, software, or a combination thereof. Further, the implementation may be external to the domains 250 and/or distributed among them and/or implemented in software in whole or in part and/or in any combination thereof.

In some embodiments, exception handling logic 234 may determine an exception occurring within one of the domains 250, may determine a plurality of domains associated with the exception, may generate exception data, may communicate the generated exception data to the plurality of associated domains, may operate an exception scheduler, may establish communication between the exception scheduler and the associated domains 250, and process the exception.

Figure 3:
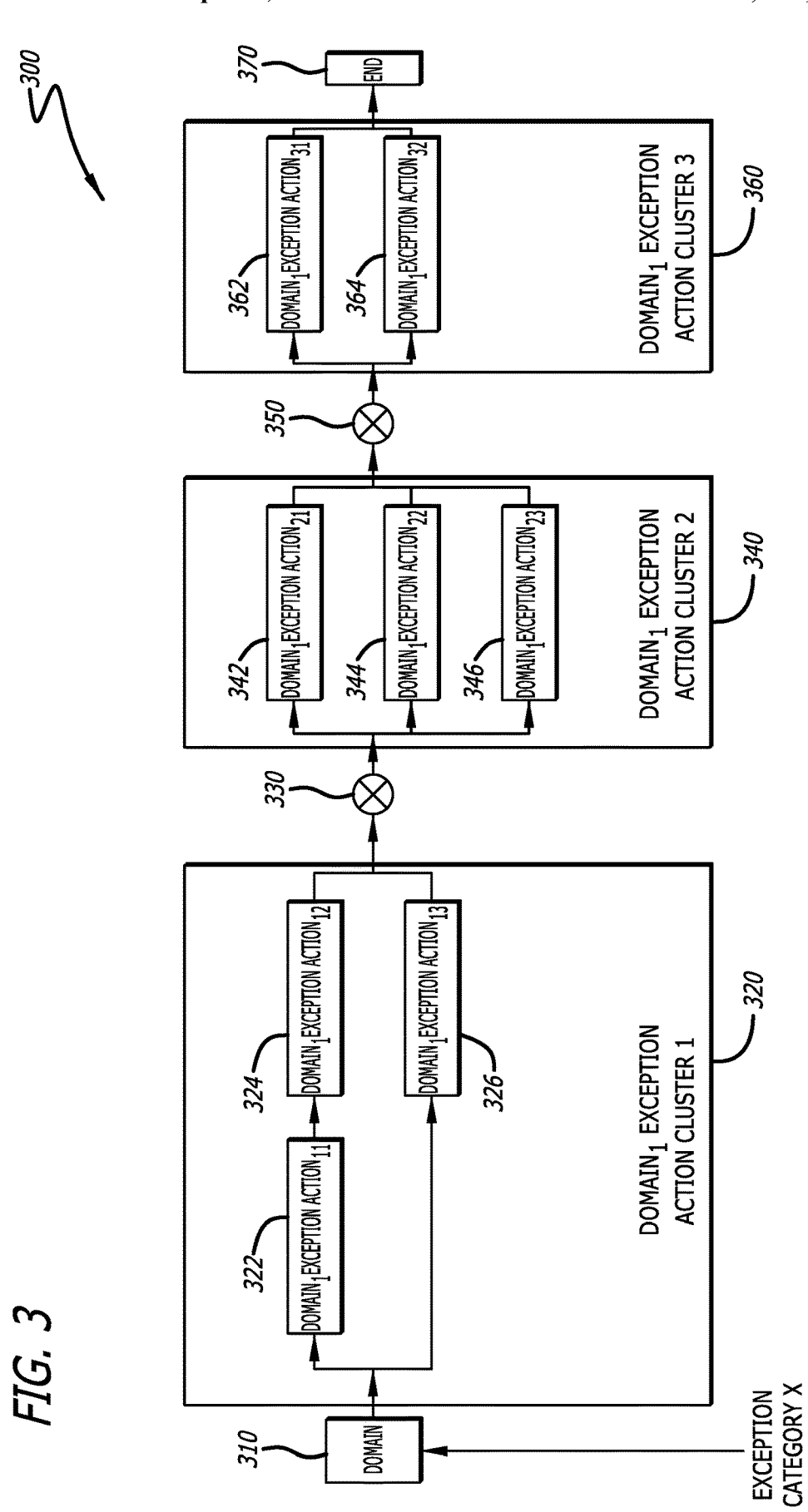
FIG. 3 is a conceptional diagram of exception handling in a single domain in accordance with an embodiment of the disclosure.

In some embodiments, when operating the exception scheduler, exception handling logic 234 may establish communication between the exception scheduler with at least one of the plurality of domains, may receive an exception notification from one of the plurality of domains, may determine at least one sync point associated with the exception notification, may enable at least one domain sync detector associated with the exception notification, may associate a plurality of exception action schedules to each of the enabled domain sync detectors, may generate a plurality of exception action state data configured to update based on each action task completed by a domain, may update one or more exception action schedules upon determining a change in the exception action state data, and may notify one or more domains that the sync point is completed upon completion of all associated exception action schedules Referring to FIG. 3, a conceptional diagram of exception handling in a single domain in accordance with an embodiment of the disclosure is shown. Illustrative embodiment 300 may comprise $Domain_1$ 310, $Domain_1$ Exception Action $Cluster_1$ 320, $Domain_1$ Exception Action Cluster 3 340, and $Domain_1$ Exception Action Cluster 3 360. An end of process indicator 370 is also present in the figure.

An exception of category X is detected and categorized by $Domain_1$ 310 which begins to process it. $Domain_1$ 310 proceeds to process $Domain_1$ Exception Action Cluster 1 320. This involves performing a number of exception actions required to handle the exception that have no dependency on the other domains. These exception actions may be performed in series, in parallel, or both. In the embodiment of FIG. 3, $Domain_1$ Exception $Action_{11}$ 322 may be performed in series with $Domain_1$ Exception $Action_{12}$ 324. Meanwhile, $Domain_1$ 310 may also perform $Domain_1$ Exception $Action_{13}$ 326 in parallel with $Domain_1$ Exception $Action_{11}$ 322 and $Domain_1$ Exception $Action_{12}$ 324. An exception action cluster may comprise any number of exception actions in serial or in parallel as a matter of design choice.

Once all of the exception actions of $Domain_1$ Exception Action $Cluster_1$ 320 are complete, $Domain_1$ 310 may pause at sync point 330 and wait for the associated sync point requirement for sync point 330 to be fulfilled. A sync point requirement may be a set of conditions, particularly the completion of exception actions or exception action clusters from other domains upon which the next exception action cluster $Domain_1$ Exception Action $Cluster_2$ 340 may depend. These dependencies may be, for example, the availability of particular data, the obsolescence of particular data, the release of a portion of shared memory, an action involving a peripheral, or the like.

In the embodiment of FIG. 3, once the sync point requirement for sync point 330 has been met, $Domain_1$ 310 may proceed to $Domain_1$ Exception Action $Cluster_2$ 340 which further comprises $Domain_1$ Exception $Action_{21}$ 342, $Domain_1$ Exception $Action_{22}$ 344, and $Domain_1$ Exception $Action_{23}$ 346, processed in parallel. Once all $Domain_1$ Exception Action $Cluster_2$ exception actions are completed, $Domain_1$ may pause at sync point 350 and wait for its associated sync point requirement to be fulfilled. Once the next sync point requirement is received, $Domain_1$ 310 may proceed to $Domain_1$ Exception Action Cluster 3 360 which further comprises exception actions $Domain_1$ Exception $Action_{31}$ 362, and $Domain_1$ Exception $Action_{32}$ 364, processed in parallel. Once all are processed, the exception handling by $Domain_1$ 310 is completed (end of process indicator 370).

Referring to FIG. 4A, a conceptional diagram of exception handling across multiple domains in accordance with an embodiment of the disclosure is shown. In an illustrative embodiment 400, the exception handling function comprises $Domain_1$ 410, $Domain_2$ 412, and $Domain_3$ 414. In this embodiment, three domains are shown but any number or combination of domains may be used. The exception handling logic 234 may determine that $Domain_1$ 410, $Domain_2$ 412, and $Domain_3$ 414 may be required to perform the tasks necessary to handle the exception when it occurs. The exception may originate in one of these domains (called the source domain or the coordinating domain).

$Domain_1$ comprises three exception action clusters 420, 440, and 460 and two sync points 430 and 450. $Domain_2$ comprises two exception action clusters 422 and 442 and one sync point 432. $Domain_3$ comprises four exception action clusters 424, 444, 464, and 484 and three sync points 434, 454, and 474. End of process indicators 490, 492, and 494 mark the end of each domain's portion of the exception handling.

$Domain_1$ Exception Action Cluster 1 420 may comprise exception actions $Domain_1$ Exception Action 11 420A and $Domain_1$ Exception Action 12 420B, which process serially, and $Domain_1$ Exception $Action_{13}$ 420C, which processes in parallel with $Domain_1$ Exception $Action_{11}$ 420A and $Domain_1$ Exception Action 12 420B. While this level of detail is only shown with respect to $Domain_1$ Exception Action Cluster 1 420 to avoid obscuring the inventive concepts presented, all of the other exception action clusters 422, 424, 440, 442, 444, 460, 464, and 484 may comprise one or more exception actions which may be processed in series, in parallel, or in any combination thereof within their respective exception action clusters.

The exception action clusters 420, 422, 424, 440, 444, and 464 may pause at sync points 430, 432, 434, 450, 454, and 474, respectively. In each case, the sync point requirement is dependent on the completion of exception action clusters in at least one of the other domains. For illustrative embodiment 400, after exception action cluster 420 processes, $Domain_1$ may pause at sync point 430 and wait for $Domain_2$ and $Domain_3$ to complete the exception actions (not shown in FIG. 4A) required to meet the sync point requirement at sync point 430. When the sync point requirement is met, $Domain_1$ may subsequently process $Domain_1$, exception action cluster 2 440 before pausing at sync point 450. In this case, $Domain_1$, exception action cluster 3 460 is only dependent upon $Domain_2$. When the sync point requirement for sync point 450 is fulfilled (not shown in FIG. 4A), $Domain_1$ processes exception action cluster 3 460 which proceeds to the end where the exception processing of $Domain_1$ terminates (end of process indicator 490).

Similarly, after $Domain_2$, exception action cluster 1 422 processes, $Domain_2$ may pause at sync point 432 and wait for $Domain_1$ to complete the exception action clusters that are required to meet the sync point requirement at sync point 432 (not shown in FIG. 4A). When the sync point requirement is met, $Domain_2$ may processes exception action cluster 1 442 which proceeds to completion (end of process indicator 492) where the exception processing of $Domain_2$ terminates.

In a like manner, after $Domain_3$, exception action cluster 1 424 processes, $Domain_3$ may pause at sync point 432 and wait for $Domain_2$ to complete the exception action clusters that are required to meet the sync point requirement at sync point 432 (not shown in FIG. 4A). When the sync point requirement is met, $Domain_3$ may processes exception action cluster 2 444, sync point 454, $Domain_3$, exception action cluster 3 464, sync point 474, and $Domain_3$, exception action cluster 4 484, pausing at each sync point until the associated sync point requirement has been met (not shown in FIG. 4A). Finally, the processing ends and the exception processing of $Domain_3$ terminates (process indicator 494).

Referring to FIG. 4B, a timing diagram of exception handling across multiple domains in accordance with an embodiment of the disclosure is shown. While not drawn to scale, time proceeds from left to right in the figure showing one possible sequence of events for the operation of an illustrative embodiment like the one shown in FIG. 4A. Like reference numerals from FIG. 4A correspond the relative timing durations of the exception action clusters 420, 422, 424, 440, 442, 444, 460, 464, and 484. Similarly, the sync points 430, 432, 434, 450, 454, and 474 shown indicate the time dependency of the sync point requirements with respect to Event-A, Event-B, Event-C, Event-D, Event-E, and Event-F.

In $Domain_1$, exception action cluster 1 420 may finish processing (Event-A) and may pause at sync point 430 until the associated sync point requirement (both Event-B in $Domain_2$ and Event-C in $Domain_3$) can be fulfilled. At this point, $Domain_1$ may process exception action cluster 2 440 and then pauses at sync point 450 until the associated sync point requirement (Event-E in $Domain_2$) can be fulfilled. Now, $Domain_1$ may process exception action cluster 3 460 until all of the $Domain_1$ exception actions are complete and terminate processing (end of process indicator 490). Note that end of process indicator 490 may itself be an event (Event-F) which is required by another domain.

In $Domain_2$, exception action cluster 1 422 may finish processing (Event-B) and may pause at sync point 430 until the associated sync point requirement (Event-A in $Domain_1$) can be fulfilled. In this illustrative embodiment, $Domain_2$, exception action cluster 1 422 takes longer to process than $Domain_1$, exception action cluster 1 420, so $Domain_2$ may proceed immediately to process $Domain_2$, exception action cluster 1 442 with minimal delay. $Domain_2$ exception action cluster 1 442 may then continue to process to completion (end of process indicator 492 and also Event-E) completing the $Domain_2$ portion of handling the exception.

In $Domain_3$, exception action cluster 1 424 may finish processing (Event-C) and may pause at sync point 434 until the associated sync point requirement (Event-B in $Domain_2$) can be fulfilled. $Domain_3$ may then proceed by processing $Domain_3$, exception action cluster 2 444 and pausing at sync point 454 until the associated sync point requirement (both Event-D in $Domain_1$ and Event-E in $Domain_2$) may be fulfilled. $Domain_3$ may then proceed by processing $Domain_3$, exception action cluster 3 464 and pausing at sync point 474 until the associated sync point requirement (Event-F in $Domain_1$) may be fulfilled. $Domain_3$, exception action cluster 4 484 may then continue to process to completion (end of process indicator 494) completing the $Domain_3$ portion of handling the exception.

Figure 5:
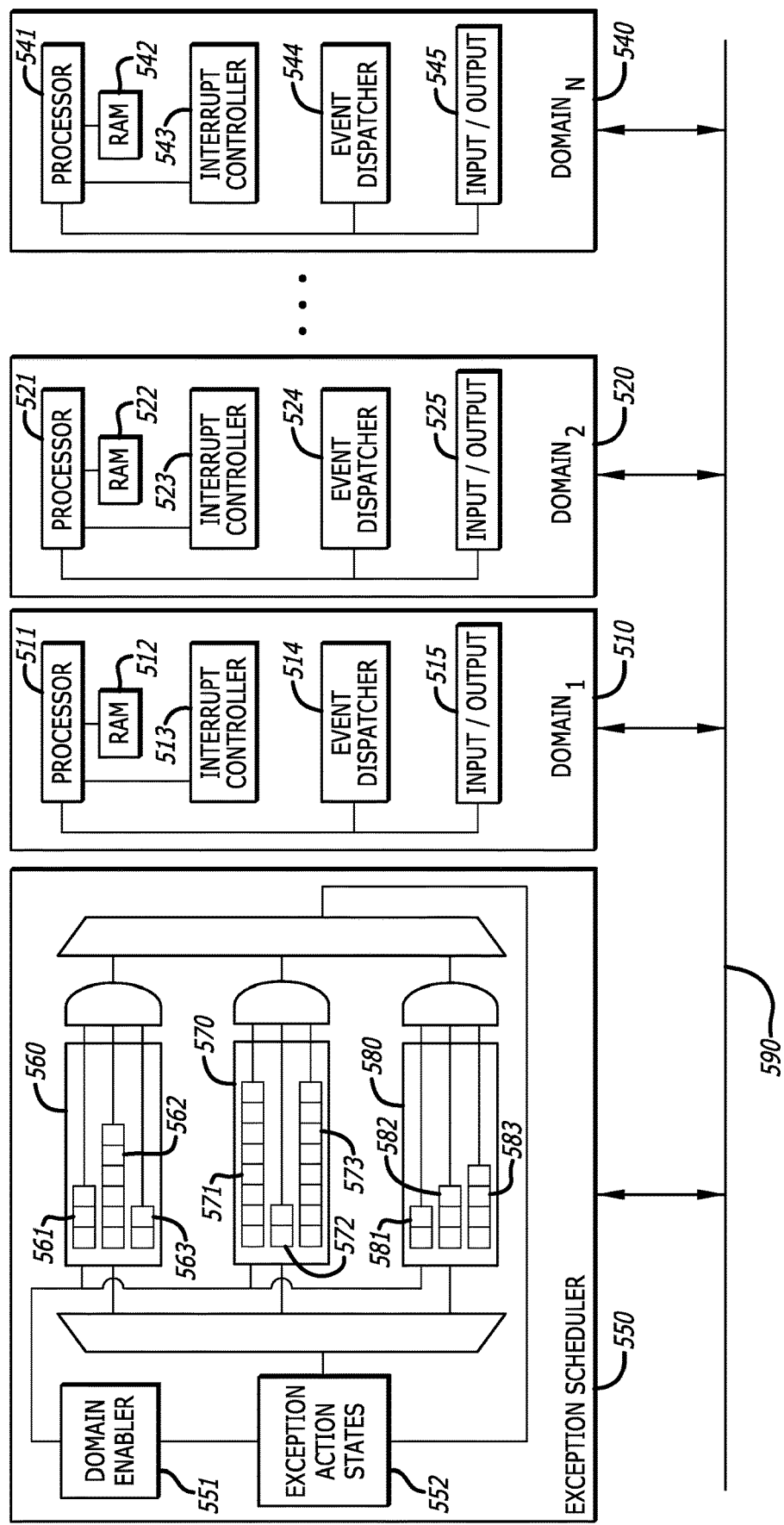
FIG. 5 is a schematic block diagram of an exception scheduler for exception handling across multiple domains in accordance with an embodiment of the disclosure.

Referring to FIG. 5, a schematic block diagram of an exception scheduler for exception handling across multiple domains in accordance with an embodiment of the disclosure is shown. In some embodiments the exception scheduler 550 may be implemented on an integrated circuit like, for example, an application specific integrated circuit (ASIC), a system on a chip (SOC), a field programmable gate array (FPGA), etc. In other embodiments, exception scheduler 550 may be implemented utilizing components and/or integrated circuits on a printed circuit board (PCB). In still more embodiments, this function may be implemented in software, and/or hardware, and/or some combination thereof. Present in FIG. 5 are $Domain_1$ 510, Domaine 520, $Domain_N$ 540, exception scheduler 550, and communications bus 590. While three domains are shown in the figure, any number may be present as a matter of design choice.

The domains 510 through 540 may operate asynchronously from one another, at different processor frequencies, at different operating voltages, and the like. While appearing identical in FIG. 5, each of the domains 510 through 540 has its own area of responsibility in the SSD controller. It is understood that the domains 510 through 540 may or may not be identical, may be implemented with different processors, firmware, peripherals, memory resources, etc. These differences make the domains 510 through 540 optimal to handle exception actions in their particular areas of responsibility. While only three domains 510, 520, and 540 are shown, any number of domains may be present as a matter of design choice.

$Domain_1$ may comprise processor 511, random access memory (RAM) 512, interrupt controller 513, event dispatcher 514, and input/output interface 515. Processor 511 may be any type of processor like, for example, a Central Processing Unit (CPU), a Microprocessor Unit (MPU), and the like. Any suitable processor architecture such as x86, ARM, RISC-V, PowerPC, etc., may be used.

RAM 512 may be coupled to processor 511. In some embodiments, RAM 512 may be a local memory exclusive to $Domain_1$, while in other embodiments RAM 512 may be part of a larger memory shared between some or all of the domains. RAM 512 may comprise in whole or in part a local or shared cache memory.

Event dispatcher 514 may be coupled to processor 511. In many embodiments, event dispatcher 514 may receive exception handling event information from exception scheduler 550 and may notify processor 511 via interrupt controller 513. In other embodiments, exception scheduler 550 may bypass event dispatcher 514 and send an interrupt directly to processor 511.

Input/output interface 515 may be used to communicate with the other domains by means of communications bus 590 and/or other side-channel connections (not shown). Communications bus 590 may employ any sort of signaling protocol like, for example, Advanced Microcontroller Bus Architecture (AMBA), Open Core Protocol (OPC), CoreConnect, etc.

Domaine may comprise processor 521, random access memory (RAM) 522, interrupt controller 523, event dispatcher 524, and input/output interface 525. Processor 521 may be any type of processor like, for example, a Central Processing Unit (CPU), a Microprocessor Unit (MPU), and the like. Any suitable processor architecture such as x86, ARM, RISC-V, PowerPC, etc., may be used.

RAM 522 may be coupled to processor 521. In some embodiments, RAM 522 may be a local memory exclusive to $Domain_1$, while in other embodiments RAM 522 may be part of a larger memory shared between all of the domains. RAM 522 may comprise in whole or in part a local or shared cache memory.

Event dispatcher 524 may be coupled to processor 521. In many embodiments, event dispatcher 524 may receive exception handling event information from exception scheduler 550 and may notify processor 521 via interrupt controller 523. In other embodiments, exception scheduler 550 may bypass event dispatcher 524 and send an interrupt directly to processor 521.

Input/output interface 525 may be used to communicate with the other domains by means of communications bus 590 and/or other side-channel connections (not shown). Communications bus 590 may employ any sort of signaling protocol like, for example, Advanced Microcontroller Bus Architecture (AMBA), Open Core Protocol (OPC), Core-Connect, etc.

Domain$_N$ may comprise processor 541, random access memory (RAM) 542, interrupt controller 543, event dispatcher 544, and input/output interface 545. Processor 541 may be any type of processor like, for example, a Central Processing Unit (CPU), a Microprocessor Unit (MPU), and the like. Any suitable processor architecture such as x86, ARM, RISC-V, PowerPC, etc., may be used.

RAM 542 may be coupled to processor 541. In some embodiments, RAM 542 may be a local memory exclusive to Domain$_N$, while in other embodiments RAM 542 may be part of a larger memory shared between all of the domains. RAM 542 may comprise in whole or in part a local or shared cache memory.

Event dispatcher 544 may be coupled to processor 541. In many embodiments, event dispatcher 544 may receive exception handling event information from exception scheduler 550 and may notify processor 541 via interrupt controller 543. In other embodiments, exception scheduler 550 may bypass event dispatcher 544 and send an interrupt directly to processor 541.

Input/output interface 545 may be used to communicate with the other domains by means of communications bus 590 and/or other side-channel connections (not shown). Communications bus 590 may employ any sort of signaling protocol like, for example, Advanced Microcontroller Bus Architecture (AMBA), Open Core Protocol (OPC), Core-Connect, etc.

Exception scheduler 550 may be coupled to Domain$_1$ 510 through Domain$_N$ 540 by means of communications bus 590 and/or other side-channel connections (not shown) like, for example, mailboxes, messaging, and other forms of inter-process communications. Exception scheduler 550 may comprise domain enabler 551, exception action states 552, and domain sync detectors 560, 570, and 580. Each of the domain sync detectors 560, 570, and 580 may be associated with Domain$_1$ 510, Domain$_2$ 520 and Domain$_N$ 540, respectively. While three domains and three domain sync detectors are shown, it is understood that there may be any number of domains and associated domain sync detectors as a matter of design choice.

In many embodiments, every domain may have an associated domain sync detector. In some embodiments, domain sync detectors 560, 570, and 580 may be physically implemented with the exception scheduler 550. In other embodiments the domain sync detectors 560, 570, and 580 may each be physically implemented with its associated domain. In yet other embodiments domain sync detectors 560, 570, and 580 may be implemented in software. In alternative embodiments domain sync detectors 560, 570, and 580 may be implemented as wires coupled between exception scheduler 550 and Domain$_1$ 510, Domain$_2$ 520, and Domain$_N$, respectively.

Domain sync detector 560 may comprise a plurality of exception action schedules 561, 562, and 563 which may each correspond to one of the domains 510, 520 and 540, respectively. In some embodiments, the entries in the exception action schedules 561, 562, and 563 may correspond to an exception action, while in other embodiments they may correspond to exception action clusters. In some embodiments, an exception action schedule entry may be a status flag indicating completion of the exception action. Such an arrangement of status flags of exception action schedules may be a bit vector. In other embodiments, an exception action schedule entry may additionally include a data structure or other information generated by the exception action. Collectively, the exception action schedules 561, 562, and 563 in domain sync detector 560 may represent all of the necessary exception actions across all domains required to process one or more exception action clusters.

Domain sync detector 570 may comprise a plurality of exception action schedules 571, 572, and 573 which may each correspond to one of the domains 510, 520 and 540, respectively. In some embodiments, the entries in the exception action schedules 571, 572, and 573 may correspond to an exception action, while in other embodiments they may correspond to exception action clusters. In some embodiments, an exception action schedule entry may be a status flag indicating completion of the exception action. Such an arrangement of status flags of exception action schedules may be a bit vector. In other embodiments, an exception action schedule entry may additionally include a data structure or other information generated by the exception action. Collectively, the exception action schedules 571, 572, and 573 in domain sync detector 570 may represent all of the necessary exception actions across all domains required to process one or more exception action clusters.

Domain sync detector 580 may comprise a plurality of exception action schedules 581, 582, and 583 which may each correspond to one of the domains 510, 520 and 540, respectively. In some embodiments, the entries in the exception action schedules 581, 582, and 583 may correspond to an exception action, while in other embodiments they may correspond to exception action clusters. In some embodiments, an exception action schedule entry may be a status flag indicating completion of the exception action. Such an arrangement of status flags of exception action schedules may be a bit vector. In other embodiments, an exception action schedule entry may additionally include a data structure or other information generated by the exception action. Collectively, the exception action schedules 581, 582, and 583 in domain sync detector 580 may represent all of the necessary exception actions across all domains required to process one or more exception action clusters.

The domains 510, 520, and 540 may communicate with exception action states 552 which maintains exception action state data. Exception action states 552 may serve as a central repository for information about the progress of exception actions and exception action clusters across all the domains 510, 520, and 540. Domains 510, 520, and 540 may maintain a working copy of this data in its associated domain sync detectors 560, 570, and 580 between sync points. Domains 510, 520, and 540 may report the completion of an exception action or an exception action cluster to exception action states 552 which updates the exception action state data. In turn, the exception action state 552 may communicate the updated exception action state data to the domains 510, 520, and 540.

The domains 510, 520, and 540 may calculate their own sync point requirements. Domains 510, 520 and 540 may reach a sync point and pause until exception action states 552 reports (based on updates to the exception action state data from other domains) that the sync point requirement for that sync point has been fulfilled and the domain may proceed on to the next exception action cluster.

When an exception is detected in one of the domains 510, 520, or 540, the domain (known as the source domain or coordinating domain) categorizes the exception, determines the proper process for handling the exception, generates the domain enabler data, and notifies domain enabler 551 of the exception to be processed. This may happen before, during, and/or after the domain may generate and/or send the initial exception action state data to exception action states 552. Domain enabler 551 stores the domain enabler data, and, based on the data, enables all of the domains 510, 520, or 540 that are part of the exception handling process.

Figure 6:
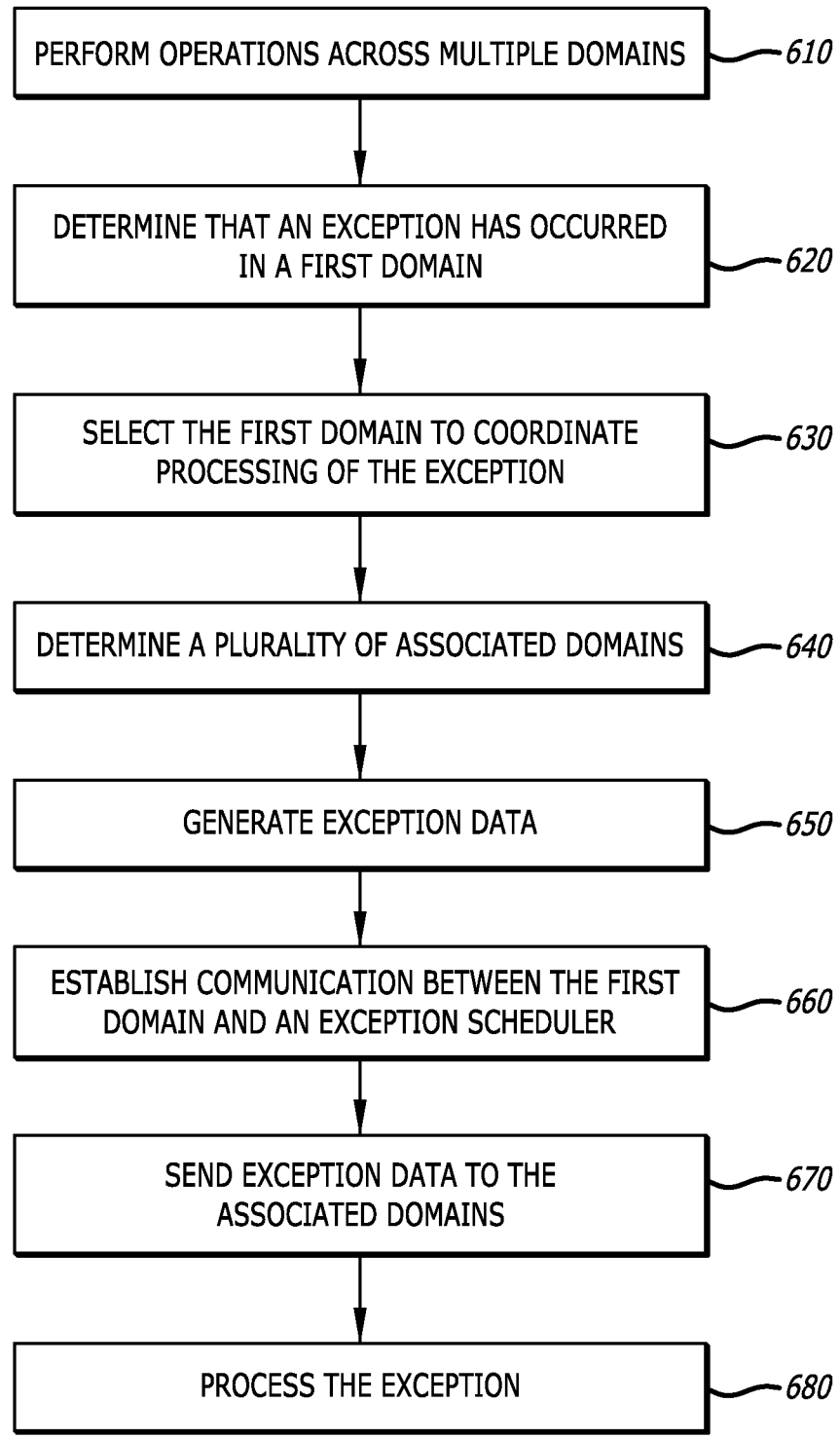
FIG. 6 is a flowchart depicting a process for exception handling in accordance with an embodiment of the disclosure.

Referring to FIG. 6, a flowchart depicting a process 600 for exception handling in accordance with an embodiment of the disclosure is shown. Process 600 may begin with an SSD operating normally with read and write operations behaving as expected. In the SSD controller there may be multiple processors. These processors may each operate with its own sphere of responsibility. The processors may be distributed across multiple domains, where each domain may operate asynchronously to the other domains (block 610). Each domain may operate with its own processor clock frequency, memory, power supply voltage, etc.

The SSD controller may be configured to handle exceptions when they occur. When an exception occurs, it may originate in a first domain (block 620). An exception may occur for a variety of reasons including, but not limited to, a hardware malfunction, a program or erase error in a NAND flash integrated circuit, the host gives a non-executable command in violation of the communication protocol, a hardware or software interrupt, or the like. In some embodiments, the exception may be detected in multiple domains. In further embodiments, multiple exceptions may occur concurrently. The source domain may be selected to coordinate the processing of the exception (block 630). Although, in certain embodiments, the exception scheduler may be configured to schedule the processing of exceptions, especially in the case of multiple concurrently occurring exceptions. This scheduling may be done in any order including, but not limited to first-in-first-out, a predefined order, a priority order based preconfigured design or initiation phase, or random order. In further embodiments, the coordination and/or generation of exception data may be done in an external One or more exception actions may be needed to respond properly. Depending on the nature of the exception, these required exception actions may be spread over one, some or all of the domains depending upon the needed areas of responsibility for proper processing of the exception. The first domain may determine the correct domains associated with the required areas of responsibility (block 640). The first domain also determines the necessary exception actions to properly handle the exception and groups them into the necessary exception action clusters.

The first domain then generates the necessary exception data, including but not limited to, the associated domains, the needed exception actions and exception action clusters, and the dependencies between the exception action clusters (block 650). However, in additional embodiments, the domain where the exception originated may be preconfigured at the design stage to provide exception data to the exception scheduler upon detection of the exception which is then communicated from the exception scheduler to the other affected domains.

The first domain may then establish communication with an exception scheduler (block 660) and may send the exception data to the exception scheduler, which may in turn send the exception data to the scheduled domains (block 670). In various embodiments, the exception data may include sync points between exception action clusters in each domain. The domains then process the exception in coordination with the exception scheduler (block 680). In certain embodiments, the exception scheduler may maintain a plurality of sync point data associated with each domain which can be refreshed upon the processing of a new exception.

Figure 7:
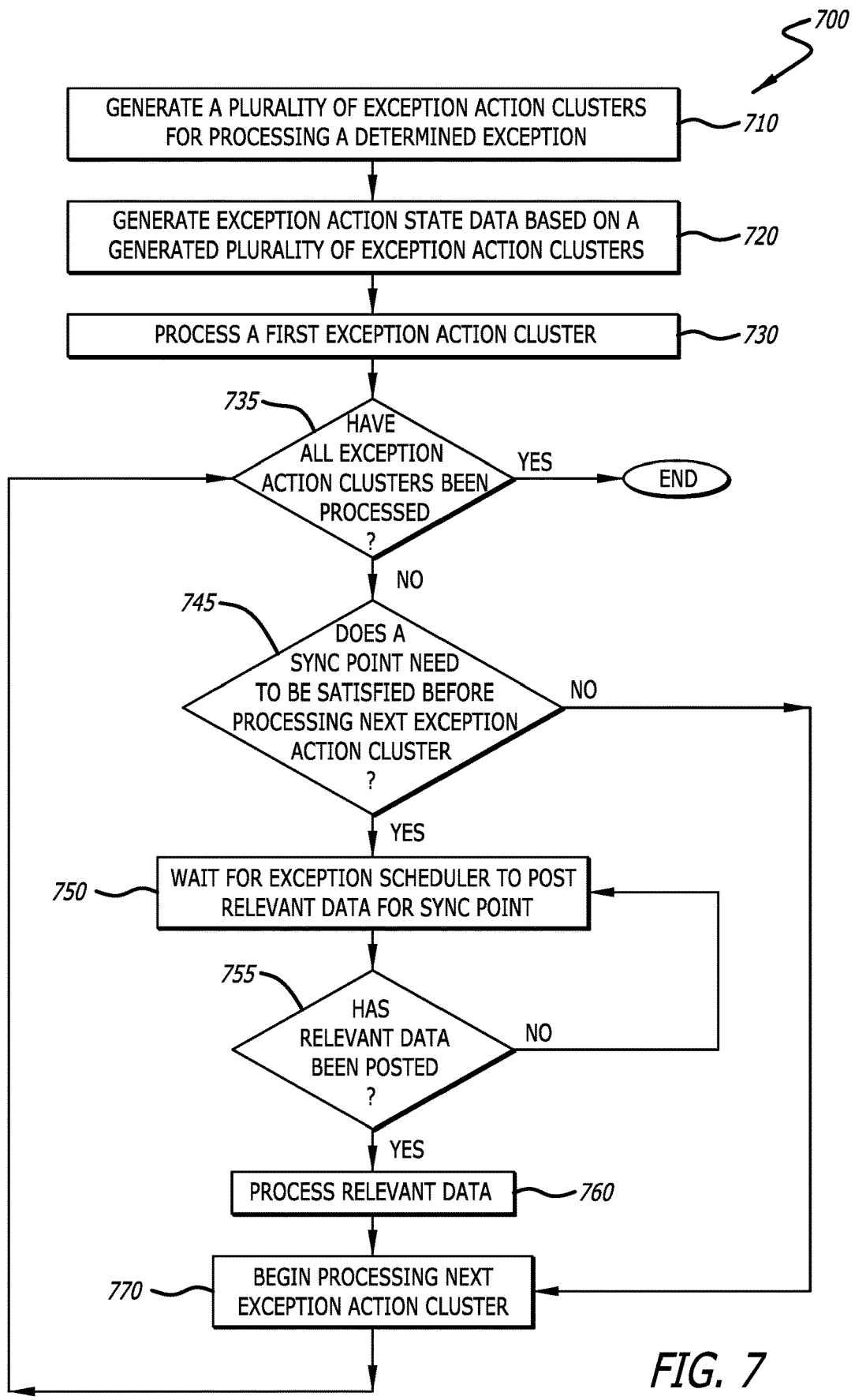
FIG. 7 is a flowchart depicting a process for the processing of exception action clusters in accordance with an embodiment of the disclosure.

Referring to FIG. 7, a flowchart depicting a process 700 for the processing of exception action clusters in accordance with an embodiment of the disclosure is shown. Process 700 may begin when an exception occurs in an SSD controller. The exception may occur in a particular domain (the source domain or coordinating domain) which may determine the nature of the exception and the necessary tasks required to process it. This may include determining the correct domains associated with the required areas of responsibility and the necessary exception actions to properly process the exception. These exception actions may be grouped into one or more exception action clusters according to the domains involved and the time dependencies between them (block 710). Once the exception action clusters are determined, the source domain may generate the exception state action data so the exception scheduler may coordinate the execution of the exception action states over the required domains (block 720).

A domain may begin to process its first exception action cluster (block 730). Before processing an exception action cluster, the domain may determine if all the exception action clusters have been processed (block 735). If all the exception action clusters have been processed, then the exception processing in the domain may end. If there are one or more exception action clusters remaining to be processed, the domain may determine if a sync point requirement must be satisfied before processing the next exception action cluster (block 745). If a sync point requirement must be satisfied, the domain may pause for the exception scheduler to post the relevant data to the exception action state data that the sync point requirement has been met (block 750). If no sync point requirement must be satisfied, the exception scheduler may proceed to process the next exception action cluster (block 770). When the processing of the next exception action cluster is complete, the domain may determine if this most recently processed exception action cluster is the final exception action cluster to be processed (block 735).

When the domain is waiting (block 750) it may monitor the exception action state data in the exception scheduler for the satisfaction of the sync point requirement to be posted by one or more other domains (block 755). If the relevant data has not been posted, the event scheduler may continue to wait for the relevant data to post (block 750). If the relevant data has been posted, the event scheduler may process the relevant data (block 760) and may begin processing the next exception action cluster (block 770). When the processing of the next exception action cluster is complete, the domain may determine if this most recently processed exception action cluster is the final exception action cluster to be processed (block 735).

Figure 8:
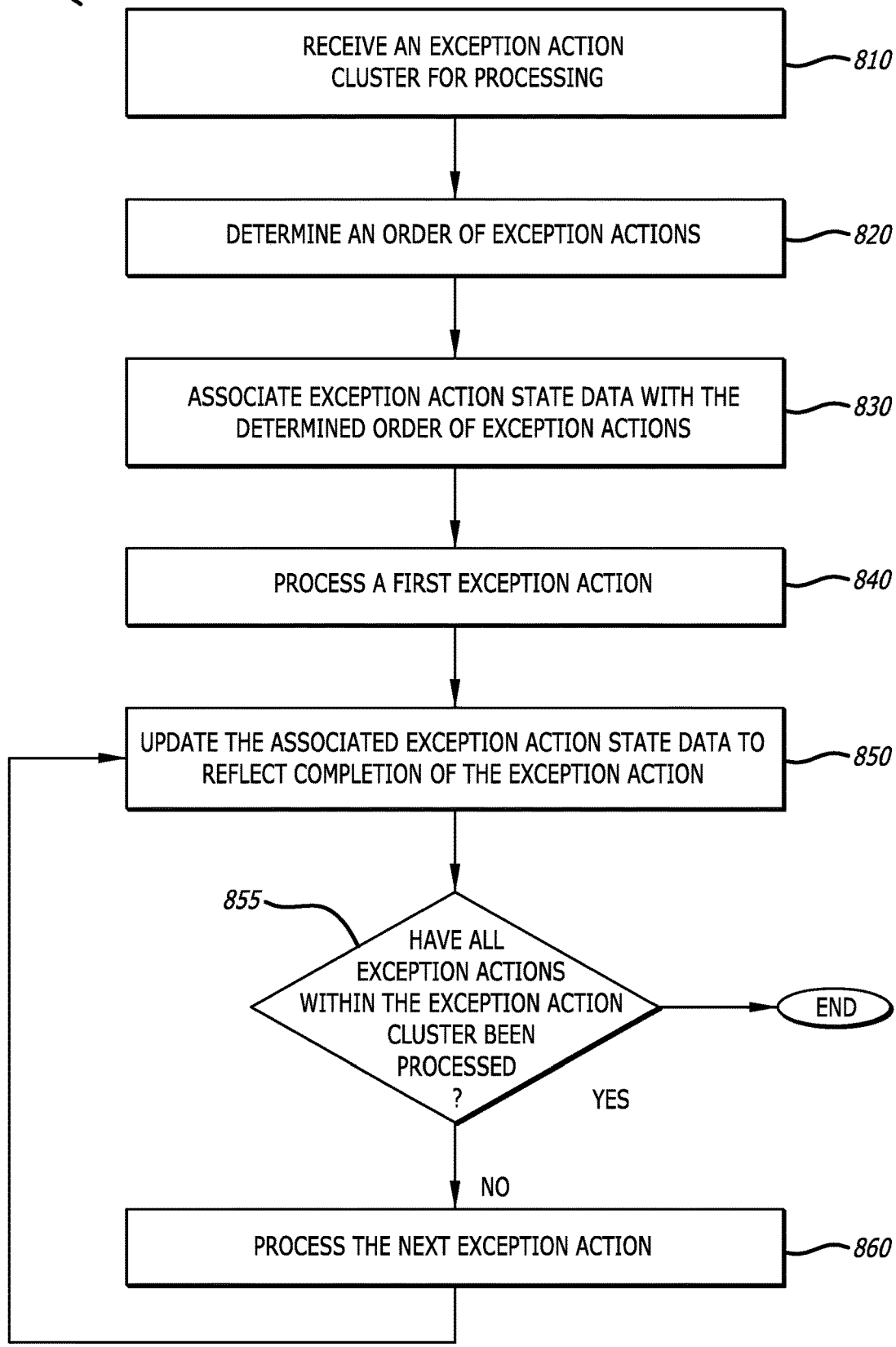
FIG. 8 is a flowchart depicting a process for the processing of exception actions in accordance with an embodiment of the disclosure.

Referring to FIG. 8, a flowchart depicting a process 800 for the processing of exception actions in accordance with an embodiment of the disclosure is shown. Process 800 may begin when a domain receives an exception action cluster for processing (block 810). The domain may determine the order of execution of the exception actions. This may involve identifying the serial and/or parallel and/or dependency relationships of the exception actions (block 820) and associating the exception action state data with the exception actions to be processed (block 830).

The domain may process a first exception action (block 840). When the exception action is complete, the domain may update the exception action state data to reflect the completion of the exception action (block 850). The domain may determine if all of the exception actions comprising the event action cluster have been processed by referencing the exception action state data (block 855). If all the event actions have been processed, then the processing of the event action cluster is complete. If there are remaining event actions to process, then the domain may process the next exception action (block 860). When the processing of the next exception action is complete, the event scheduler may update the exception action state data to reflect the completion of the exception action (block 850). It is contemplated that various embodiments of the disclosure may process exception action clusters from multiple exceptions concurrently, and not directly in a serial pattern as depicted in FIG. 8. This concurrent processing may be limited only by available processing resources.

Figure 9:
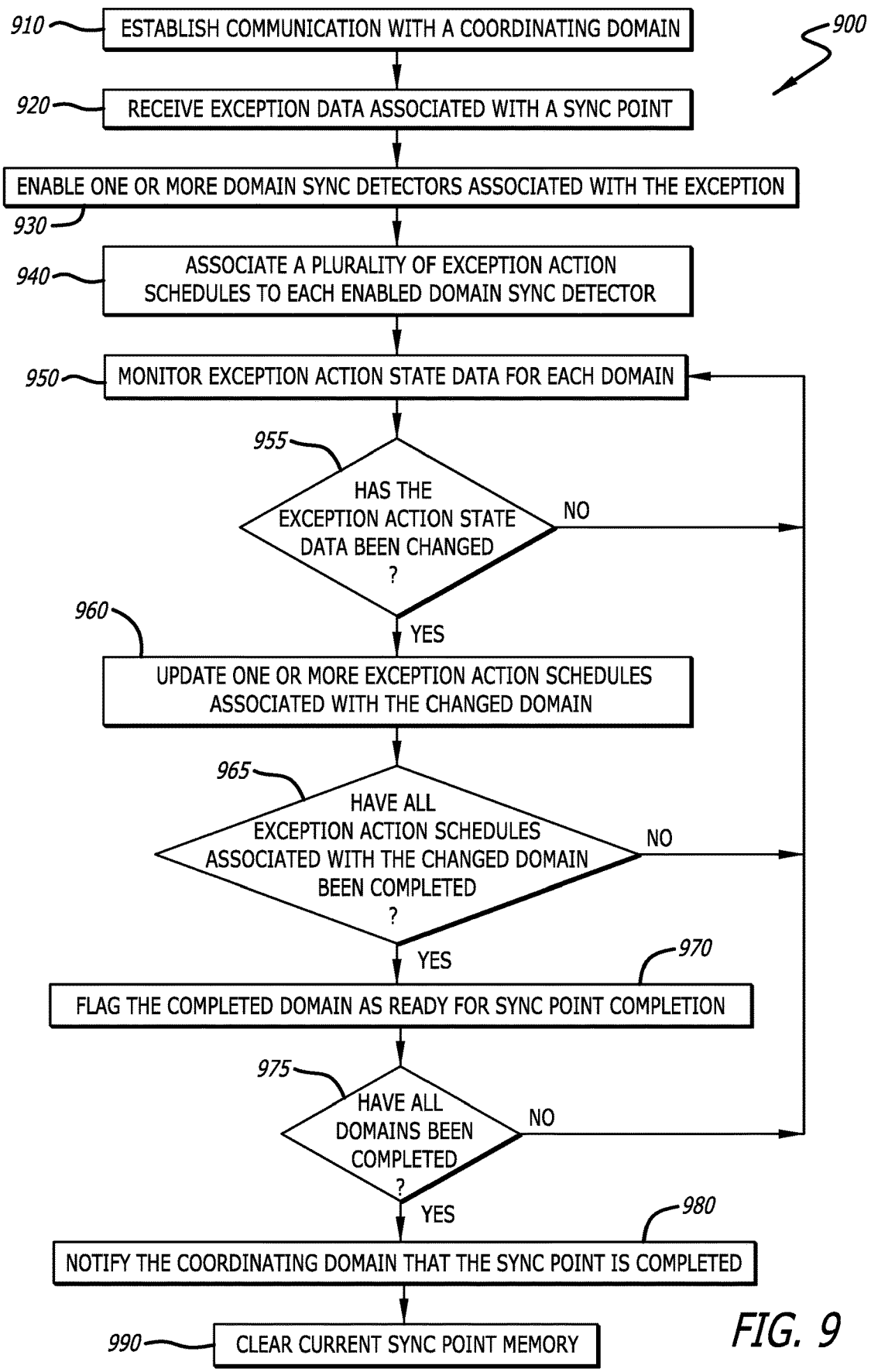
FIG. 9 is a flowchart depicting a process for operating an exception scheduler in accordance with an embodiment of the disclosure.

Referring to FIG. 9, a flowchart depicting a process 900 for operating an exception scheduler in accordance with an embodiment of the disclosure is shown. When an exception occurs, process 900 may begin with a coordinating domain establishing communication with the exception scheduler. This may be the source domain where the exception originated (block 910). The exception scheduler may then receive exception data associated with a sync point from the coordinating domain. This may be exception action state data (block 920). The exception scheduler may then enable one or more domain sync detectors in the domains associated with the exception (block 930). In some embodiments however, the exception scheduler may be configured as a passive logic that executes a predefined series of actions upon receipt of an exception occurrence and subsequent exception data received from the source domain. The exception scheduler may associate a plurality of exception action schedules to each enabled domain sync detector from the exception action state data (block 940).

The exception scheduler may then monitor the exception action state data for each enabled domain (block 950) and periodically determine if the exception action state data has been changed by one of the domains (block 955). If there has been no change, then the exception scheduler may return to monitoring the exception action state data for each enabled domain (block 950). If the exception action state data in one of the domains has changed, then the exception scheduler may update one or more exception action schedules associated with the changed domain (block 960).

The exception scheduler may determine if all of the exception action schedules associated with the changed domain have been completed (block 965). If all of the exception action schedules associated with the changed domain have not been completed, then the exception scheduler may return to monitoring the exception action state data for each enabled domain (block 950). If all of the exception action schedules associated with the changed domain have been completed, then the completed domain is flagged as ready for sync point completion (block 970).

The exception scheduler may determine if all of the domains have been completed (block 975). If not all of the domains are complete, then the exception scheduler may return to monitoring the exception action state data for each enabled domain (block 950). If all of the domains have been completed, the exception scheduler can notify the coordinating domain that the sync point has been completed (block 980). Once the plurality of sync points have been completed, the process 900 can proceed to clear the current sync point memory (block 990).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
    a memory array comprising a plurality of memory devices;
    a plurality of processors wherein each processor is configured to operate within one of a plurality of domains; and
    exception handling logic configured to:
        determine an exception occurring within one of the plurality of domains;
        determine a plurality of domains associated with the exception;
        generate exception data;
        communicate the generated exception data to the plurality of associated domains;
        establish communication with an exception scheduler; and
        process the exception, wherein processing the exception comprises:
            generating a first exception action cluster based on the exception data, wherein the first exception action cluster is a processed within a first domain;
            generating a second exception action cluster based on the exception data, wherein the second exception action cluster is processed within a second domain;
            determining a first sync point configured to pause processing in the first domain upon completion of the first exception action cluster and to resume processing when first completion requirements are met;
            determining a second sync point configured to pause processing in the second domain upon completion of the second exception action cluster, and to resume processing when second completion requirements are met;

establishing exception action state data based on the generated exception action clusters;

processing the first exception action cluster and pausing at the first sync point;

processing the second exception action cluster and pausing at the second sync point, wherein:

the exception scheduler releases the first domain to continue processing when the first completion requirements of the first sync point are met; and the exception scheduler releases the second domain to continue processing when the completion requirements of the second sync point are met.

2. The device of claim 1, wherein a domain within the plurality of domains is selected to coordinate the processing of the exception.

3. The device of claim 2, wherein the domain associated with the determination of the exception is selected as the coordinating domain.

4. The device of claim 1, wherein the sync point requirement comprises one or more exception actions to be processed by at least one associated domain.

5. The device of claim 4, wherein the exception scheduler monitors exception actions processed by all associated domains.

6. The device of claim 5, wherein the exception action processing is monitored by determining changes in exception action state data.

7. The device of claim 6, wherein the exception action state data is a bit vector.

8. A method of processing exceptions, comprising:

determining an exception occurring within one of a plurality of domains wherein each domain comprises at least one processor;

determining a set of one or more domains associated with the exception;

generating exception data comprising at least two or more exception action clusters for processing within each of the associated domains;

communicating the generated exception data to the associated domains;

establishing communication with an exception scheduler;

processing the exception, wherein processing the exception comprises:

generating a first exception action cluster based on the exception data, wherein the first exception action cluster is a processed within a first domain;

generating a second exception action cluster based on the exception data, wherein the second exception action cluster is processed within a second domain;

determining a first sync point configured to pause processing in the first domain upon completion of the first exception action cluster and to resume processing when first completion requirements are met;

determining a second sync point configured to pause processing in the second domain upon completion of the second exception action cluster, and to resume processing when second completion requirements are met;

establishing exception action state data based on the generated exception action clusters;

processing the first exception action cluster and pausing at the first sync point;

processing the second exception action cluster and pausing at the second sync point, wherein:

the exception scheduler configured to release the first domain to continue processing when the first completion requirements of the first sync point are met; and the exception scheduler configured to release the second domain to continue processing when the completion requirements of the second sync point are met.

9. The method of claim 8, wherein a notification from the exception scheduler indicates that the one or more required exception actions from the one or more associated domains have been completed.

* * * * *